(12) United States Patent
Sato et al.

(10) Patent No.: US 7,475,934 B2
(45) Date of Patent: Jan. 13, 2009

(54) MOUNTING STRUCTURE FOR EA MATERIAL

(75) Inventors: Masatoshi Sato, Yokohama (JP); Toshiyuki Horimatsu, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/583,899

(22) Filed: Oct. 20, 2006

(65) Prior Publication Data
US 2007/0090561 A1 Apr. 26, 2007

Related U.S. Application Data

(63) Continuation of application No. PCT/JP2005/007430, filed on Apr. 19, 2005.

(30) Foreign Application Priority Data

| Apr. 20, 2004 | (JP) | ............................. 2004-124433 |
| Apr. 20, 2004 | (JP) | ............................. 2004-124434 |

(51) Int. Cl.
*B60J 5/00* (2006.01)
(52) U.S. Cl. .................................. 296/146.7
(58) Field of Classification Search .............. 296/146.7; 24/293–295, 458; 52/716.5–716.7
See application file for complete search history.

(56) References Cited

U.S. PATENT DOCUMENTS

| 2,574,330 | A | * | 11/1951 | Judd ........................... 403/107 |
| 2,607,971 | A | * | 8/1952 | Bedford, Jr. .................. 52/713 |
| 4,043,579 | A | * | 8/1977 | Meyer ........................ 293/143 |
| 4,865,505 | A | | 9/1989 | Okada |
| 6,141,837 | A | * | 11/2000 | Wisniewski ................... 24/295 |
| 6,353,981 | B1 | * | 3/2002 | Smith .......................... 24/295 |
| 6,718,599 | B2 | * | 4/2004 | Dickinson et al. ............. 24/295 |
| 6,868,588 | B2 | * | 3/2005 | Dickinson et al. ............. 24/295 |
| 6,928,705 | B2 | * | 8/2005 | Osterland et al. ............. 24/295 |
| 7,096,638 | B2 | * | 8/2006 | Osterland et al. ............. 52/708 |
| 7,120,971 | B2 | * | 10/2006 | Osterland et al. ............. 24/295 |
| 7,188,392 | B2 | * | 3/2007 | Giugliano et al. ............. 24/295 |

(Continued)

FOREIGN PATENT DOCUMENTS

JP 48-45048 A 6/1973

(Continued)

*Primary Examiner*—Lori L Lyjak
(74) *Attorney, Agent, or Firm*—Sughrue Mion, PLLC

(57) ABSTRACT

A mounting structure for an EA material is provided in which the EA material can be easily mounted to a member such as a trim, and EA materials of various shapes, sizes, and hardness degrees can be securely mounted to the member. An EA material 1 made of a synthetic resin such as rigid urethane foam is mounted to a trim 2, which serves as a member, via a rib 3 and a clip 4. The EA material 1 is mounted to the trim 2 by applying the EA material 1 to the trim 2 while inserting the rib 3 into a concave slit 7. When the EA material 1 is pressed against the trim 2, ribs 3 and 3A are pressed into concave slits 7 and 7A while sliding against the leading ends of respective pawls 5. Then, the leading ends of the respective pawls 5 dig into the side circumferential surfaces of the ribs 3 and 3A, and the ribs 3 and 3A are prevented from escaping from the concave slits 7 and 7A. Thereby, the EA material 1 is mounted to the trim 2.

9 Claims, 18 Drawing Sheets

U.S. PATENT DOCUMENTS

| | | | |
|---|---|---|---|
| 2002/0164200 A1* | 11/2002 | Wisniewski | 403/220 |
| 2005/0079009 A1* | 4/2005 | Benedetti et al. | 403/329 |
| 2005/0217082 A1* | 10/2005 | Vassiliou | 24/294 |

FOREIGN PATENT DOCUMENTS

| | | | |
|---|---|---|---|
| JP | 48-045048 U | 6/1973 | |
| JP | 55-81441 L | 6/1980 | |
| JP | 55-081441 U | 6/1980 | |
| JP | 61-54512 U | 4/1986 | |
| JP | 61-054512 U | 4/1986 | |
| JP | 63-137109 U | 9/1988 | |
| JP | 3-82582 U | 8/1991 | |
| JP | 3-088004 U | 9/1991 | |
| JP | 3-88004 U | 9/1991 | |
| JP | 5-41999 U | 6/1993 | |
| JP | 5-041999 U | 6/1993 | |
| JP | 2000-318532 A | 11/2000 | |
| JP | 2001-138954 A | 5/2001 | |
| JP | 2001-322507 A | 11/2001 | |
| WO | WO 02/070905 A2 | 9/2002 | |

* cited by examiner

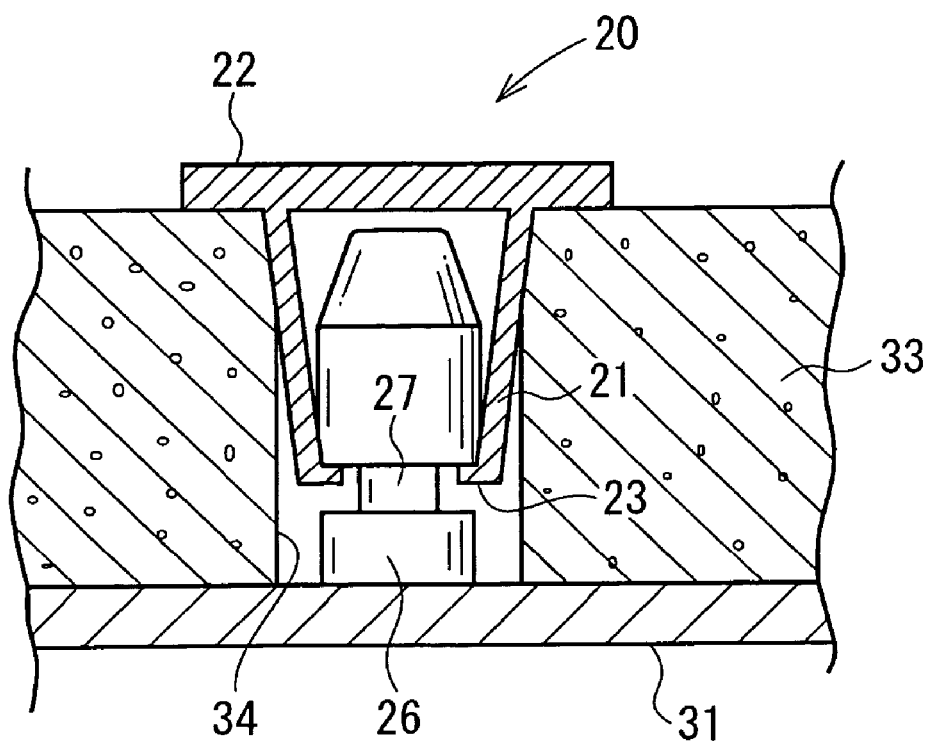

US 7,475,934 B2

MOUNTING STRUCTURE FOR EA MATERIAL

CROSS REFERENCE TO RELATED APPLICATION

This is a continuation application of PCT/JP2005/007430 filed on Apr. 19, 2005.

TECHNICAL FIELD

The present invention relates to a mounting structure for an EA material (an impact energy absorbing material), and more particularly to a mounting structure for an EA material suitable for use in a trim of an automobile.

BACKGROUND ART

For impact energy absorption (Energy Absorption: EA) in the event of a collision on a side (a lateral collision), an EA material made of rigid urethane is mounted to a door trim of an automobile. As a method for mounting the EA material made of rigid urethane to the door trim, Japanese Unexamined Patent Application Publication No. 2001-322507 describes the structure illustrated in FIGS. 7, 8a, and 8b. FIG. 7 is a cross-sectional view illustrating a mounting structure for an EA material described in FIG. 7 of the above publication. FIG. 8a is a perspective view of a cap (a cylindrical member) 20 used in the structure, and FIG. 8b is a cross-sectional perspective view of the cylindrical member 20.

The cap 20 integrally includes a cylindrical portion 21 and a flanged portion 22. The cylindrical portion 21 is provided with a pawl 23 directed inwardly from the leading end of the cylindrical portion 21. A rod 26 projects from a trim 31, and a concavity 27 is formed around the outer circumferential surface of the rod 26. The pawl 23 engages with the concavity 27.

The cylindrical portion 21 is formed with slits 24 extending from the leading end thereof in the direction parallel to the axis center line of the cylindrical portion 21. The cylindrical portion 21 is elastically deformable in the diameter expanding direction thereof.

To mount an EA material 33 to the trim 31, the EA material 33 is aligned with the surface of the trim 31 such that the rod 26 is inserted into a mounting hole 34 of the EA material 33. Then, the cap 20 is fitted and pressed onto the rod 26 to engage the pawl 23 with the concavity 27. Thereby, the flanged portion 22 presses the peripheral region around the mounting hole 34 of the EA material 33.

The cylindrical portion 21 is formed in a taper shape tapered toward the leading end thereof, and thus can be easily inserted into the mounting hole 34. In a state in which the cap 20 is fitted to the rod 26, the outer circumferential surface of the cylindrical portion 21 is in close contact with the inner circumferential surface of the mounting hole 34.

In the above conventional mounting structure for an EA material, the cap 20 and the EA material 33 are separate from each other. The mounting of the EA material to the trim 31, therefore, requires two operation processes, i.e., an operation of applying the EA material to the trim 31, and a subsequent operation of fitting the cap 20 onto the rod 26. As a result, the operations become troublesome.

When a passenger hits the EA material 33 and the EA material 33 is crushed and deformed, the cap 20 resists the crushing deformation, and the EA characteristic is decreased for that.

Since the pawl 23 can move in the concavity 27, the EA material 33 may move in the horizontal and vertical directions in FIG. 7. This may cause abnormal noise.

SUMMARY OF THE INVENTION

An object of the present invention is to provide a mounting structure for an EA material capable of remarkably improving the workability of the mounting operation of the EA material to such a member as a trim, and providing a good EA characteristic.

Another object of the present invention is to provide a mounting structure for an EA material capable of securely mounting the EA material to such a member as a trim, and preventing the movement of the EA material and the occurrence of abnormal noise.

A mounting structure for an EA material according to the first aspect is characterized in that, in a structure in which the EA material is mounted to a member, the member includes a rib and the EA material includes a concave slit into which the rib fits, that the EA material integrally includes a clip having a pair of facing pieces disposed to the inner surface of the concave slit to face each other across the concave slit and a bridging piece connecting the facing pieces, and that the pair of facing pieces nip the rib.

In the mounting structure for an EA material according to the first aspect, the clip is integrated with the EA material. Thus, through a single operation process of engaging the clip with the rib of the member while applying the EA material having the rib to the member, the EA material can be mounted to the member.

Since the facing pieces of the clip nip the rib, the EA material does not rattle, and the abnormal noise is not generated.

With pawls of the clip digging into the side surfaces of the rib, the rib is prevented from moving in the direction of escaping from the clip. Accordingly, the EA material is highly securely mounted.

If the clip is provided with surface pieces extending from the respective facing pieces in directions of separating from each other and disposed along the surface of the EA material, the clip can be accurately fitted in a mold for molding the EA material in manufacturing the EA material having the clip. That is, the position of the clip is stabilized by making the surface pieces in contact with the inner surface of the mold.

If the clip is provided with anchor pieces buried in the EA material, the clip can be solidly integrated with the EA material.

If the length in the longitudinal direction of the rib is made shorter than the length in the longitudinal direction of the concave slit, a small positional error, if any, between the EA material and the member such as the trim can be absorbed.

If the member such as the trim is provided with a plurality of ribs which are approximately perpendicular to one another in the longitudinal direction thereof, the EA material can be reliably fastened in two perpendicular directions along the surface of the member.

The clip is preferably made of a metal for its high strength. For the molding to integrate the clip with the EA material, a mold for molding the EA material may be provided with a magnet so that the clip made of a ferromagnetic metal (e.g., iron) is held by the mold by the magnetic force of the magnet.

The rib is preferably made of a synthetic resin.

A mounting structure for an EA material according to the second aspect is characterized in that, in a structure in which the EA material is mounted to a member, a convex locking portion provided on the member is inserted into a plate-like locked portion formed with a hole and integrated with the EA material, through the hole, and that pawls projecting from the rim of the hole engage with the locking portion to thereby mount the EA material to the member.

In the mounting structure for an EA material according to the second aspect, the locked portion is integrated with the EA material. Thus, through a single operation process of engaging the locked portion with the locking portion of the member while applying the EA material having the locking portion to the member, the EA material can be mounted to the member.

The locked portion may be provided on the surface of the EA material. If the EA material is made of a foamed resin such as urethane foam, the locked portion is securely adhered to and integrated with the surface of the EA material.

With pawls of the locked portion digging into the side surface of the locking portion, the locking portion is prevented from moving in the direction of escaping from the locked portion. Accordingly, the EA material is highly securely mounted.

The hole of the locked portion may be a round hole (a circular hole), or may be in a rectangular shape. A cylindrical locking portion is preferably inserted into the round hole. Meanwhile, either one of a circular locking portion and a rib-like locking portion of a flat plate shape may be inserted into the rectangular hole. If the cylindrical locking portion is inserted into the rectangular hole, a small positional error, if any, between the EA material and the member such as the trim can be absorbed.

The locked portion is preferably made of a metal for its high strength. To integrate the locked portion with the EA material, a mold for molding the EA material may be provided with a magnet so that the locked portion made of a ferromagnetic metal (e.g., iron) is held by the mold by the magnetic force of the magnet.

The locking portion is preferably made of a synthetic resin.

In the present invention, the EA material is preferably made of synthetic resin foam (a foamed material) such as rigid urethane foam.

The mounting structure for an EA material is suitable for use in the mounting of a door trim placed along the inner surface of an automobile cabin. However, the mounting structure for an EA material is not limited to this.

BRIEF DESCRIPTION OF THE DRAWINGS

FIG. 7 is a cross-sectional view illustrating a conventional example.

BEST MODE FOR CARRYING OUT THE INVENTION

Figure 1A:
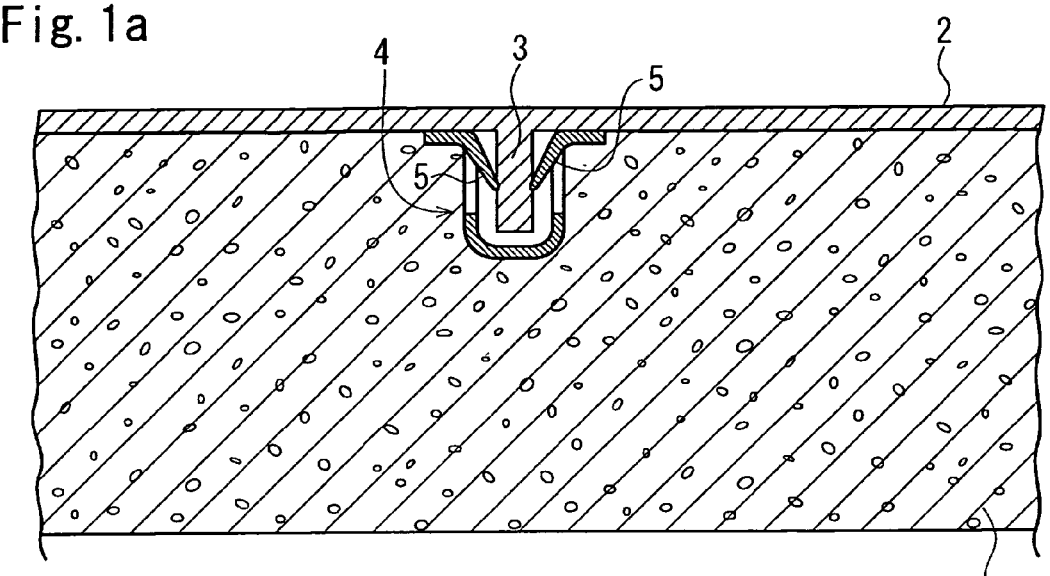
FIG. 1a is a cross-sectional view illustrating a mounting structure for an EA material of an embodiment according to the first aspect.
Figure 1B:
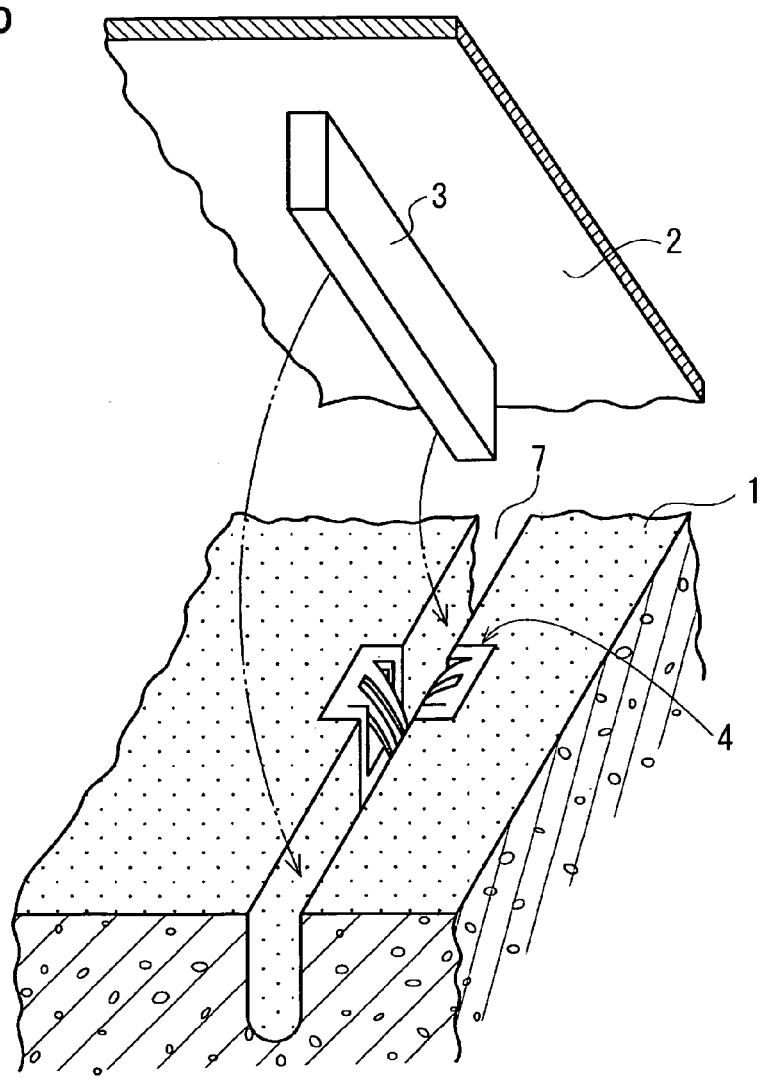
FIG. 1b is a perspective view illustrating the engaging relationship between a rib and a clip in the mounting structure for an EA material.
Figure 2:
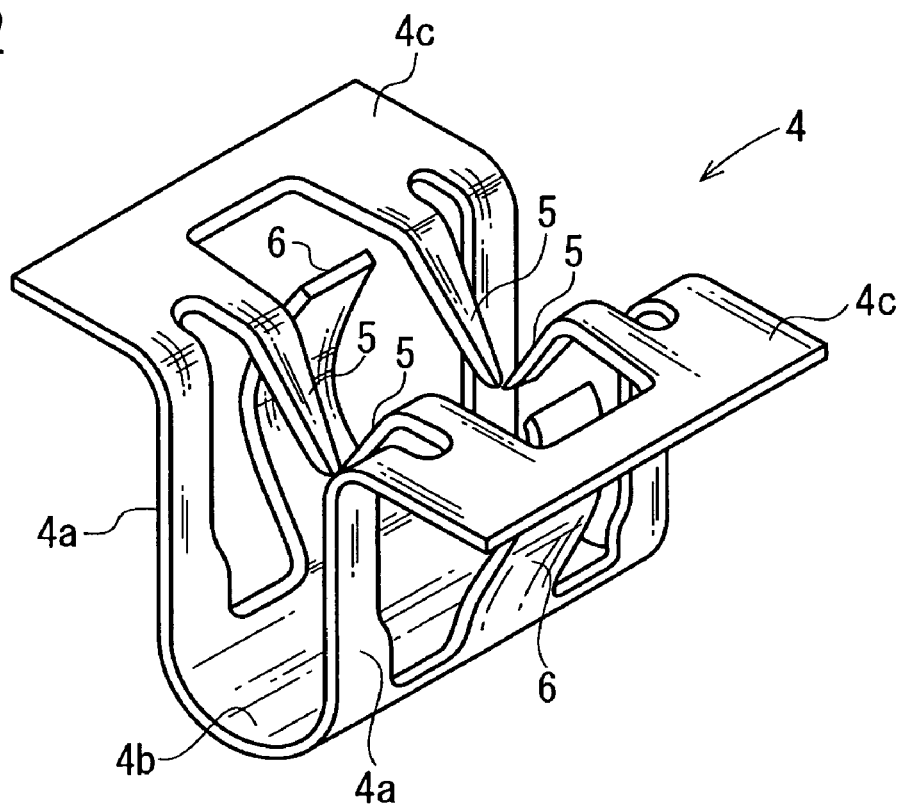
FIG. 2 is a perspective view of the clip used in the mounting structure for an EA material according to the embodiment.
Figure 3:
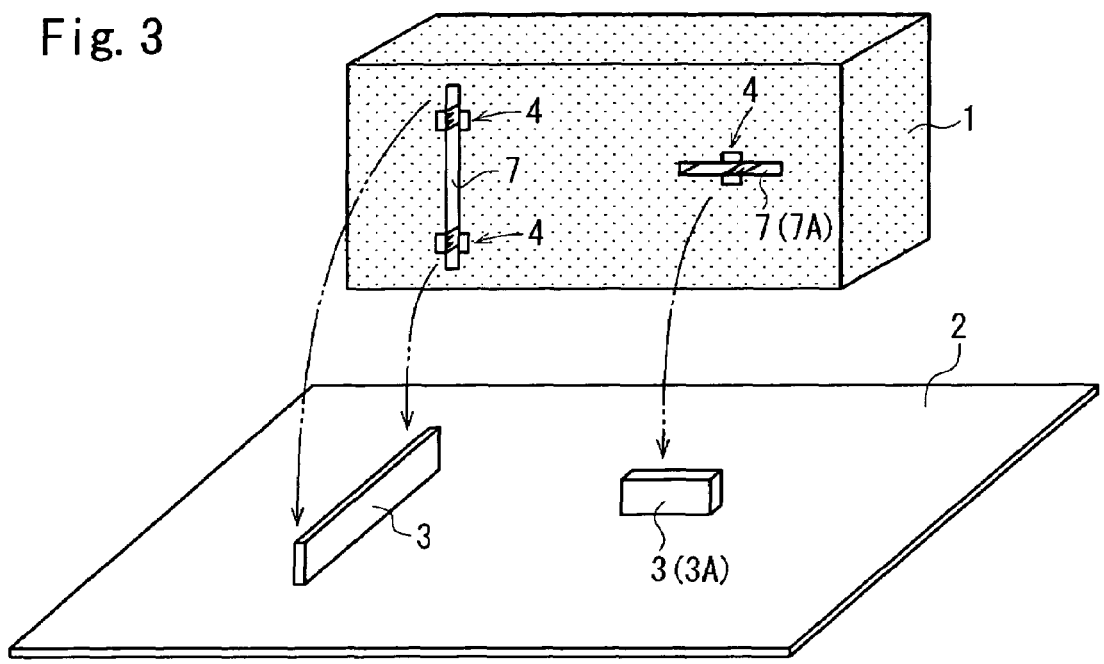
FIG. 3 is an exploded perspective view illustrating the embodiment.

With reference to the drawings, embodiments will be described. FIG. 1a is a cross-sectional view in an approximately horizontal direction illustrating a mounting structure for an EA material according to an embodiment. FIG. 1b is a perspective view illustrating the engaging relationship between a rib and a clip in the mounting structure for an EA material. FIG. 2 is a perspective view of the clip, and FIG. 3 is a perspective view illustrating a state in which the EA material is being mounted. FIGS. 4 and 5 are cross-sectional views and a perspective view for explaining a method of manufacturing the EA material having the rib, respectively.

As illustrated in FIG. 1, an EA material 1 made of synthetic resin foam such as rigid urethane foam is mounted to a trim (a door trim in the present embodiment) 2 made of a synthetic resin, which serves as a member, via a rib 3 and a clip 4. In the present embodiment, the clip 4 made of a ferromagnetic metal (e.g., iron) is integrally provided to the EA material 1, and the rib 3 engages with the clip 4.

The rib 3 is formed by a flat plate provided to stand from the trim 2. The leading end side in the standing direction of the rib 3 may be chamfered into a tapered portion which decreases in width toward the leading end thereof.

The clip 4 is formed by an approximately U-shaped clasp having a pair of facing pieces 4a and 4a and a bridging piece 4b connecting the facing pieces 4a and 4a.

In the present embodiment, the facing pieces 4a and 4a are provided with surface pieces 4c and 4c extending from the leading ends thereof in directions of separating from each other.

Each of the facing pieces 4a and 4a is provided with pawls 5 projecting therefrom. The respective pawls 5 and 5 extend in a tongue shape toward the bridging piece 4b from the leading end side of the facing pieces 4a (the side of the surface pieces 4c). The pawls 5 and 5 are inclined with respect to the plate surfaces of the facing pieces 4a and 4a such that the pawls 5 and 5 approach each other toward the leading ends thereof. The crossing angle of each of the pawls 5 and the corresponding facing piece 4a is preferably approximately 20 to 45°. In a state in which the rib 3 is not engaged with the clip 4, the interval between the leading ends of the pawls 5 and 5 is smaller than the thickness of the rib 3, and the leading ends of the pawls 5 and 5 may be in contact with each other.

In the present embodiment, the facing pieces 4a and 4a are provided with anchor pieces 6 projecting therefrom in directions of separating from each other.

The clip 4 is integrated with the EA material 1 to fit along the inner surface of a concave slit 7 formed in the EA material 1. The facing pieces 4a and 4a are disposed to the side surfaces of the concave slit 7, and the bridging piece 4b is disposed to the bottom surface of the concave slit 7. The surface pieces 4c are disposed along the surface of the EA material 1.

In the present embodiment, ribs 3 and 3A are provided on the EA material 1 to extend in two perpendicular directions. Correspondingly, two concave slits 7 and 7A are formed in the EA material 1.

A multitude (two in the drawing) of the clips 4 are provided in the longer concave slit 7, while a small number (one in the drawing) of the clips 4 are provided in the shorter concave slit 7 (7A).

The EA material 1 having the clips 4 is mounted to the trim 2 by applying the EA material 1 to the trim 2 while inserting the ribs 3 into the concave slits 7. When the EA material 1 is pressed against the trim 2, the ribs 3 and 3A are pressed into the concave slits 7 and 7A, while sliding against the leading ends of the respective pawls 5. Then, the leading ends of the respective pawls 5 dig into the side circumferential surfaces of the ribs 3 and 3A, so that the ribs 3 and 3A are prevented from escaping from the concave slits 7 and 7A. Thereby, the EA material 1 is mounted to the trim 2.

In this way, solely through the single operation process of superimposing the EA material 1 having the clips 4 on the trim 2, the EA material 1 can be mounted to the trim 2. Accordingly, the working efficiency of the mounting operation is remarkably improved. Further, since the ribs 3 and 3A and the concave slits 7 and 7A are provided in the two perpendicular directions, the EA material 1 can be fastened in the two perpendicular directions on the plate surface of the trim 2. Furthermore, since the respective pawls 5 dig into the ribs 3 and 3A, the ribs 3 and 3A are immobile with respect to the clips 4. Thus, the EA material 1 is securely mounted, and the rattling of the EA material 1 and the occurrence of abnormal noise are prevented.

In the present embodiment, the ribs 3 and 3A are shaped into plates of a low height. Thus, when the EA material 1 is crushed and deformed, the ribs 3 and 3A do not act as a resistance. Further, even in the area near the ribs 3 and 3A, the EA material 1 has a sufficient thickness and thus has a good impact absorbing characteristic.

In the mounting structure for the EA material 1, the length in the longitudinal direction of each of the ribs 3 and 3A is shorter than the length in the longitudinal direction of the corresponding one of the concave slits 7 and 7A. Therefore, a small positional error, if any, in the ribs 3 and 3A and the concave slits 7 and 7A can be absorbed.

To manufacture the EA material 1 having the clips 4, a mold including a lower mold 10 and an upper mold 11 is used, as illustrated in FIGS. 4a, 4b, 4c, and 5. The upper mold 11 is provided with a convexity 12 onto which the clip 4 fits, a magnet 13 for magnetically suctioning and holding the clip 4, and male portions 14 for forming the concave slit 7. The clip 4 is attached to nip the convexity 12. The convexity 12 has a smooth surface. In the removal from the mold, therefore, the pawls 5 slidingly move on the surface of the convexity 12, and the clip 4 is smoothly removed from the mold together with the molded EA material 1.

Figure 4A:
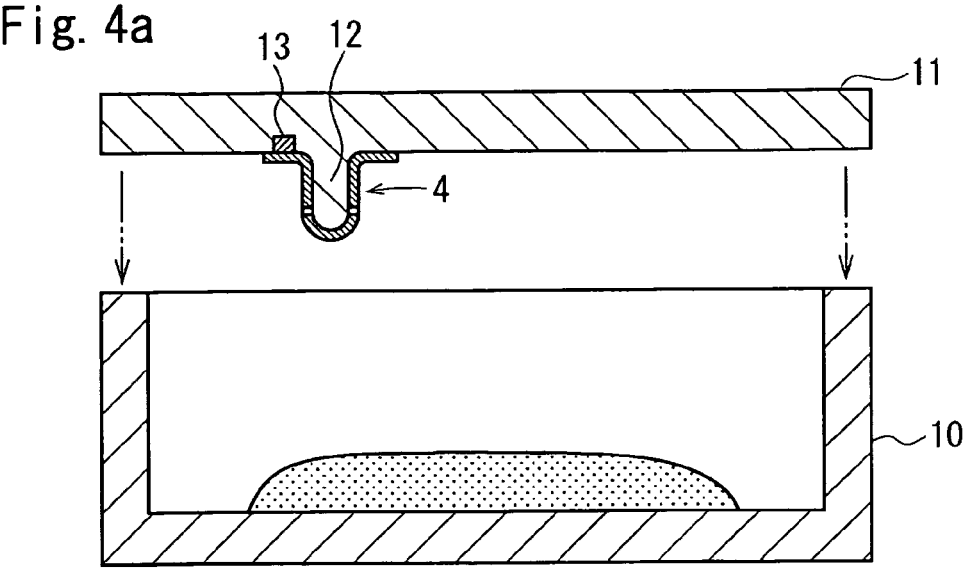
FIGS. 4a, 4b, and 4c are cross-sectional views for explaining a method of manufacturing the EA material having the clip.
Figure 5:
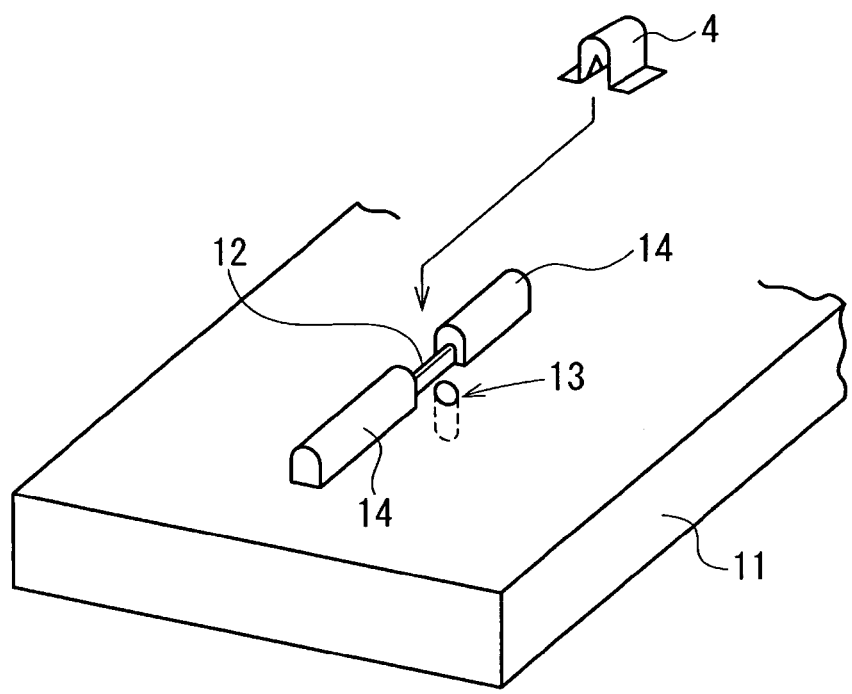
FIG. 5 is a perspective view of an upper mold for molding the EA material.

As illustrated in FIG. 4a, the clip 4 is held by the convexity 12 of the upper mold 11, and a synthetic resin material is supplied in the cavity for molding. In the case of urethane foam or the like, the original solution of the urethane foam or the like is supplied in the lower mold 10 and foamed. The injection foam molding may be employed.

Figure 4B:
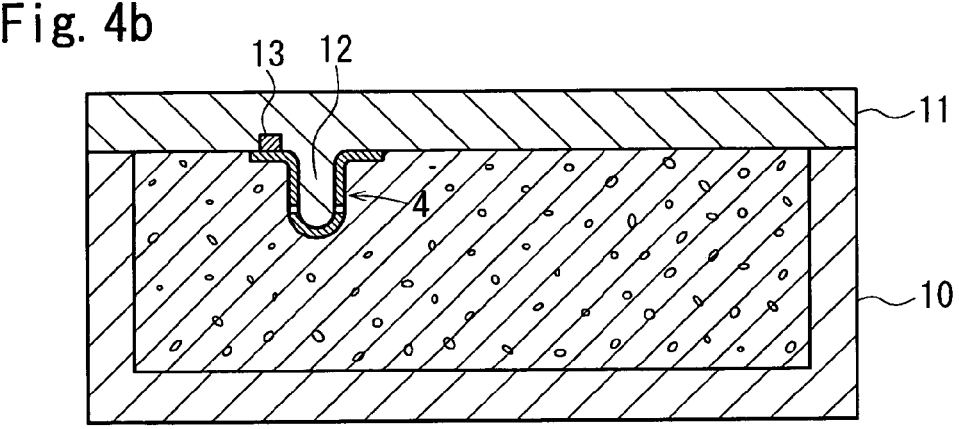
Figure 4C:
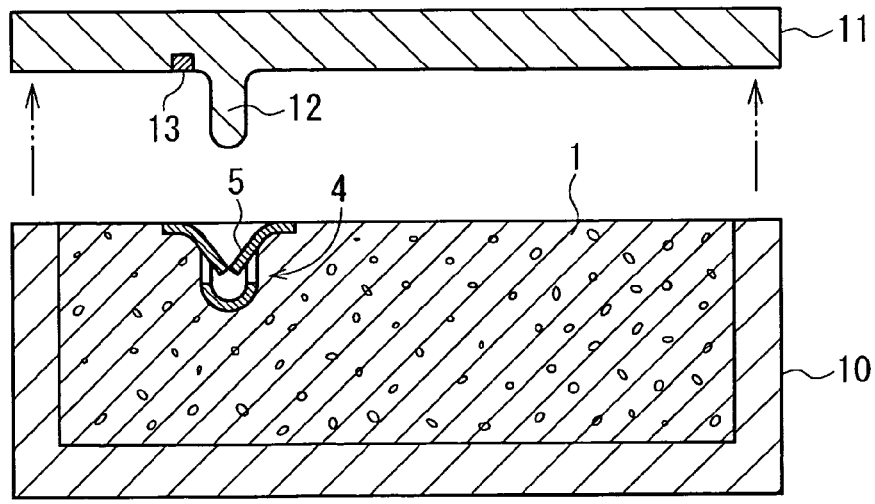

When the original solution of the resin is foamed, as illustrated in FIG. 4b, the foamed rein adheres to the clip 4, and the EA material 1 integrated with the clip 4 is molded. Then, as illustrated in FIG. 4c, the upper mold 11 is removed for the mold removal, and the EA material 1 having the clip 4 is molded. Since the anchor pieces 6 are provided in the present embodiment, the bond strength between the EA material 1 made of the foamed resin and the clip 4 made of a metal is sufficiently high.

Figure 6:
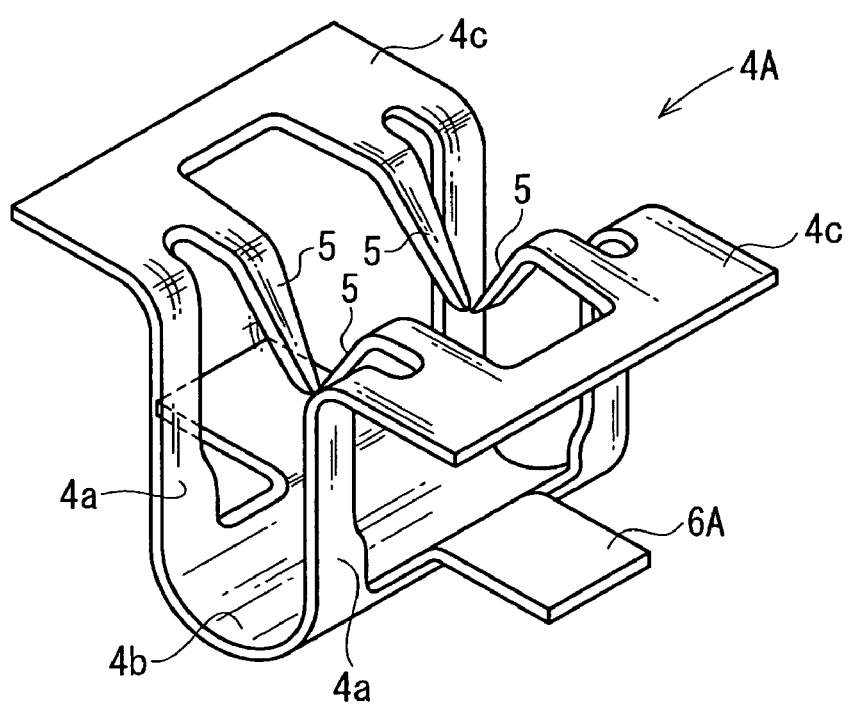
FIG. 6 is a perspective view of another clip.
Figure 8A:
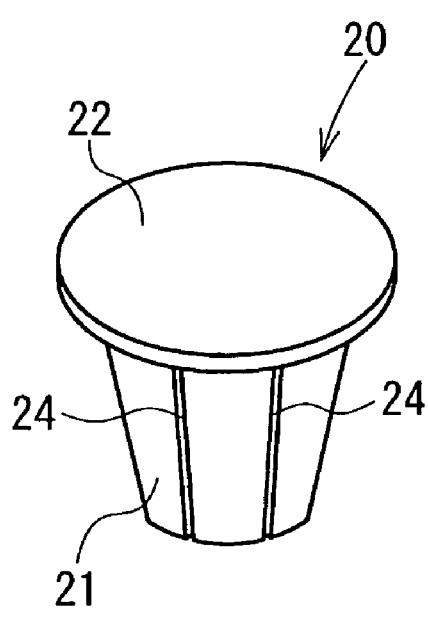
FIGS. 8a and 8b are explanatory diagrams of the structure shown in FIG. 7.
Figure 8B:
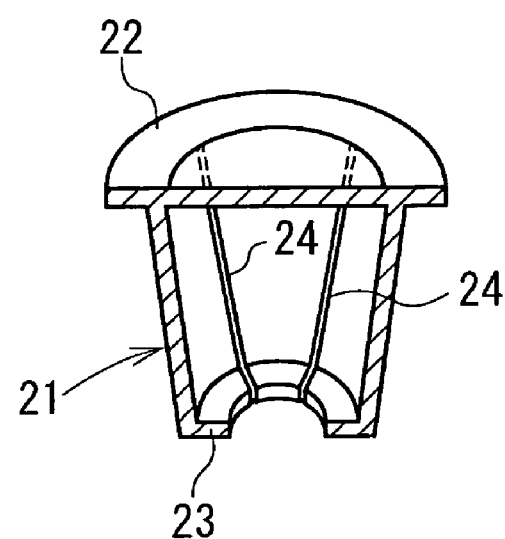
Figure 9:
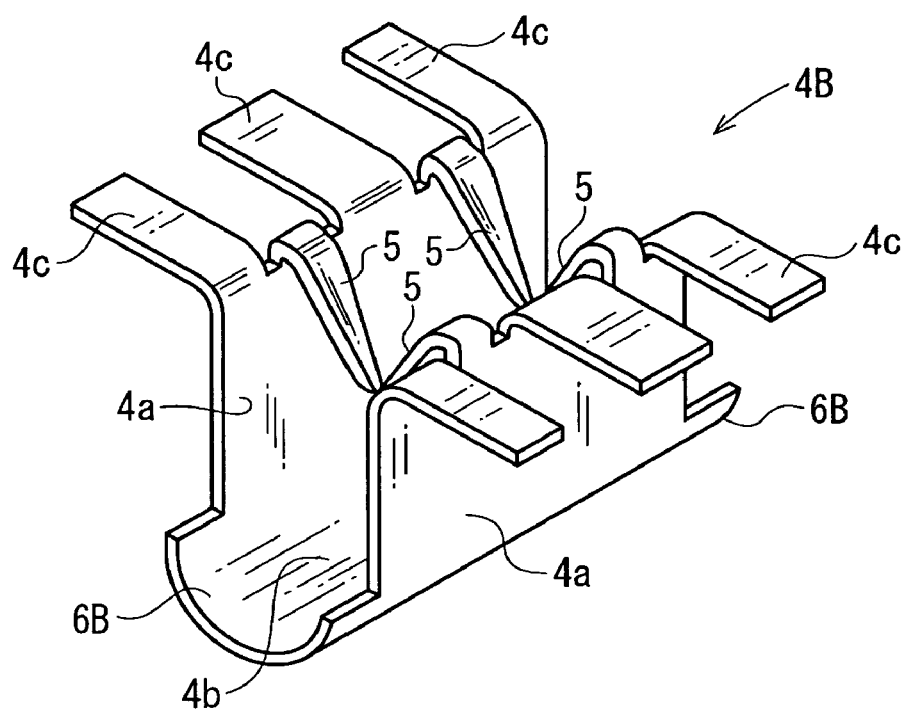
FIG. 9 is a perspective view of still another clip.
Figure 10:
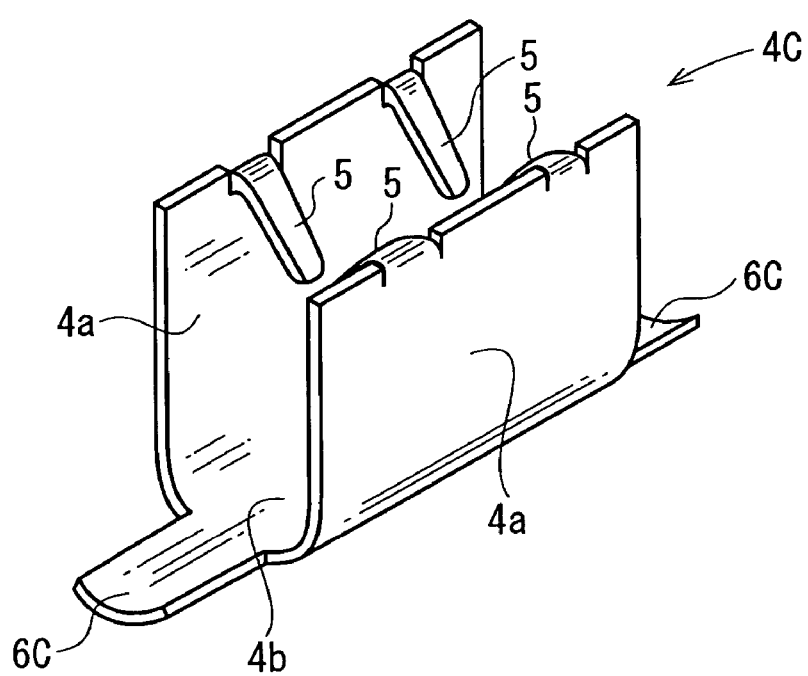
FIG. 10 is a perspective view of still yet another clip.

The above-described embodiment is one example of the present invention. Thus, the present invention may be implemented in other embodiments than the illustrated one. For example, the number of the pawls may be different from the illustrated one. Further, as in the case of a clip 4A shown in FIG. 6, anchor pieces 6A may overhang approximately perpendicularly from the facing pieces 4a. Furthermore, as in the case of clips 4B and 4C shown in FIGS. 9 and 10, anchor pieces 6B or 6C may overhang sideward from the bridging piece 4b. With the above configuration, the anchoring effect is increased, and the bond strength between the EA material 1 and the clip 4A can be increased. In the clip 4C, the surface pieces 4c are omitted.

Figure 11A:
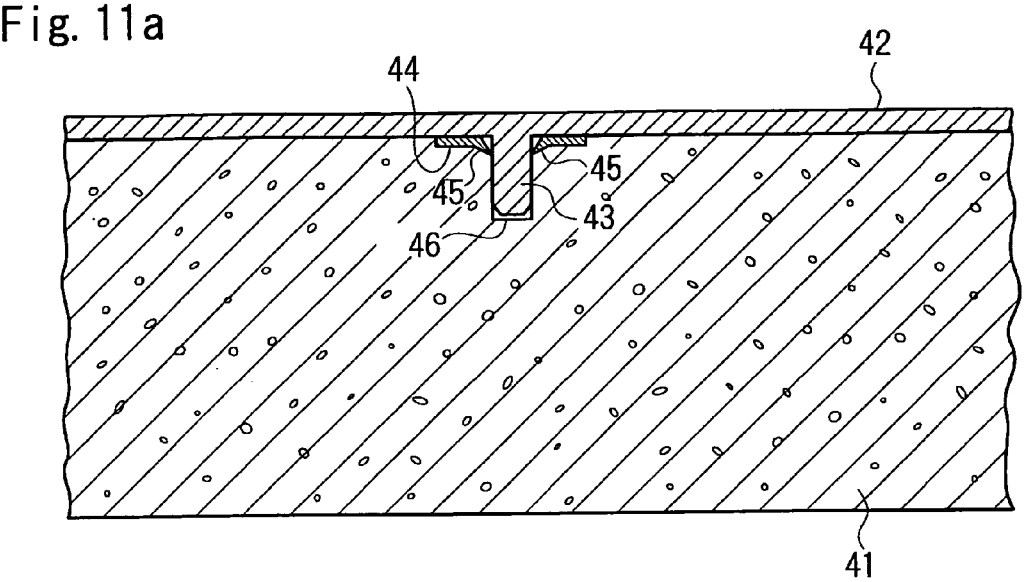
FIG. 11a is a cross-sectional view in an approximately horizontal direction illustrating a mounting structure for an EA material of an embodiment according to the second aspect.
Figure 11B:
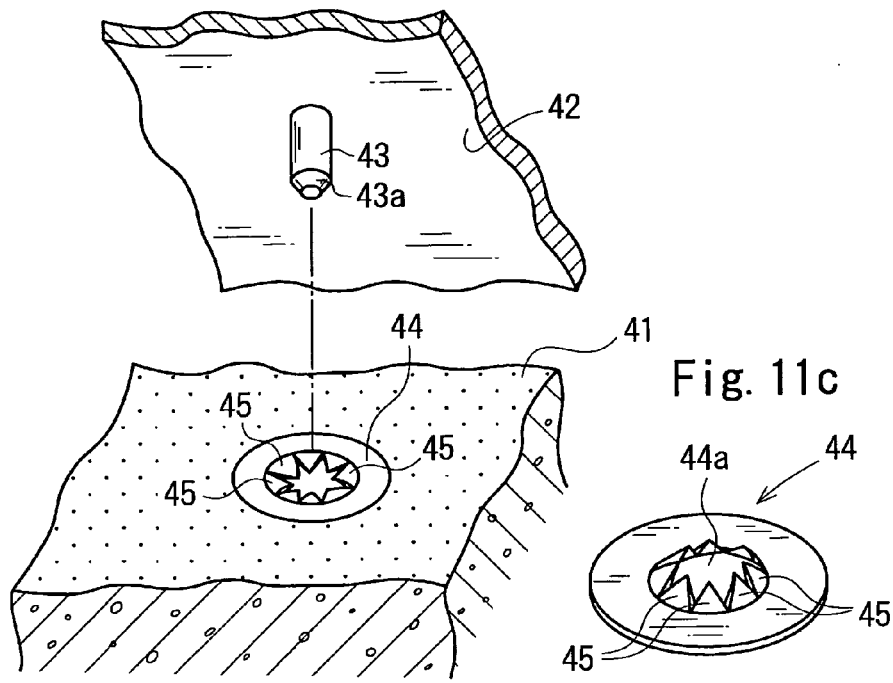
FIG. 11b is a perspective view of a locking portion and a locked portion of the mounting structure for an EA material.
Figure 11C:
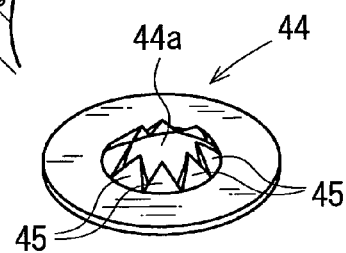
FIG. 11c is a perspective view of the locked portion of the mounting structure for an EA material, as viewed from the opposite side.
Figure 12A:
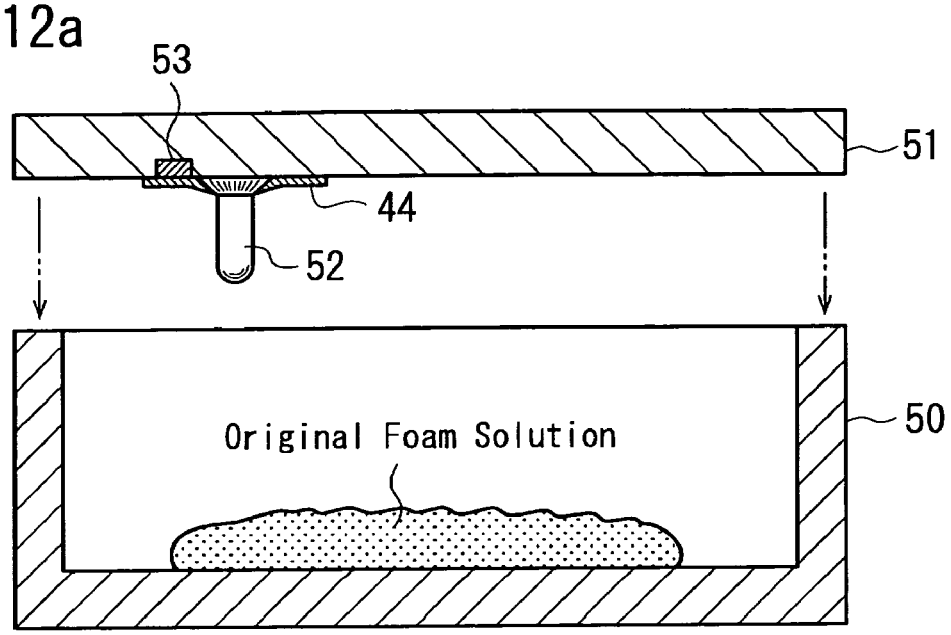
FIGS. 12a and 12b are cross-sectional views for explaining a method of manufacturing the EA material having the locked portion.
Figure 12B:
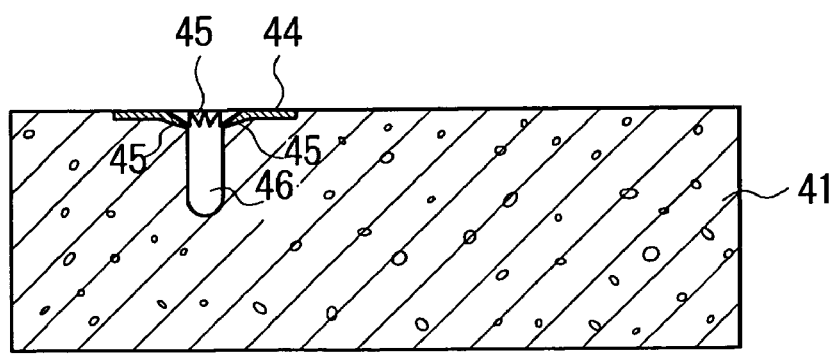

FIG. 11a is a cross-sectional view in an approximately horizontal direction illustrating a mounting structure for an EA material of an embodiment according to the second aspect. FIG. 11b is a perspective view of a locking portion and a locked portion of the mounting structure for an EA material. FIG. 11c is a perspective view of the locked portion of the mounting structure for an EA material, as viewed from the opposite side. FIGS. 12a and 12b are cross-sectional views for explaining a method of manufacturing the EA material having the locked portion.

As illustrated in FIGS. 11a and 11b, an EA material 41 made of synthetic resin foam such as rigid urethane foam is mounted to a trim (a door trim in the present embodiment) 42 made of a synthetic resin, which serves as a member, via a locking portion 43. In the present embodiment, a locked portion 44 made of a ferromagnetic metal (e.g., iron) is integrally provided to the EA material 41, and the locking portion 43 engages with the locked portion 44.

The locking portion 43 is formed by a cylinder provided to stand from trim 42. The leading end side in the standing direction of the locking portion 43 is formed with a tapered portion 43a which decreases in diameter toward the leading end thereof. Thus, the locking portion 43 can be easily inserted into the locked portion 44.

The locked portion 44 is shaped into a plate of a small thickness and disposed on the surface of the EA material 41. The locked portion 44 is formed with a circular hole 44a. The hole 44a is provided with a plurality of pawls 45 projecting from the inner circumferential rim thereof. In the present embodiment, the pawls 45 are each in a triangular shape and aligned in the circumferential direction of the hole 44a. The respective pawls 45 are inclined to slightly stand toward one side in the axis center direction of the hole 44a. The crossing angle of the plate surfaces of the pawls 45 and the circular disk surface of the locked portion 44 is preferably approximately 30 to 160°.

The EA material 41 is formed with a cavity 46 concentric with the hole 44a. The diameter of the cavity 46 is equal to the diameter of a circle passing through the leading ends of the respective pawls 45. The pawls 45 stand toward the direction of entering into the cavity 46.

In a state in which the locking portion 43 is not inserted in the hole 44a, the diameter of the locking portion 43 is preferably approximately 1.1 to 1.5 times as large as the diameter of the circle passing through the leading ends of the respective pawls 45.

Although only one of the locked portion 44 is shown in FIGS. 11a and 11b, two or more of the locked portion 44 may be provided, depending on the size and shape of the EA material 41. The position of the locked portion 44 is also selected depending on the size and shape of the EA material 41.

The EA material 41 having the locked portion 44 is mounted to the trim 42 by applying the EA material 41 to the trim 42 while inserting the locking portion 43 into the cavity 46 through the hole 44a. When the EA material 41 is pressed against the trim 42, the locking portion 43 is inserted into the cavity 46 through the hole 44a while sliding against the leading ends of the respective pawls 45. Then, the leading ends of the respective pawls 45 dig into the side circumferential surface of the locking portion 43, and the locking portion 43 becomes immobile with respect to the hole 44a. Thereby, the EA material 41 is mounted to the trim 42.

In this way, solely through the single operation process of superimposing the EA material 41 having the locked portion 44 on the trim 42, the EA material 41 can be mounted to the trim 42. Accordingly, the working efficiency of the mounting operation is remarkably improved. Further, since the respective pawls 45 surrounding the locking portion 43 dig into the locking portion 43, the locking portion 43 is immobile with respect to the locked portion 44. Thus, the EA material 41 is securely mounted, and the rattling of the EA material 41 and the occurrence of abnormal noise are prevented.

As illustrated in FIG. 11a, the locked portion 44 is shaped into the plate of a small thickness. Thus, when the EA material 41 is crushed and deformed, the locked portion 44 does not act as a resistance. Further, the locking portion 43 does not pass completely through the EA material 41, and the EA material 41 has a sufficient thickness even in the area near the locking portion 43 and the locked portion 44. Therefore, the EA material 41 has a good impact absorbing characteristic even in the area near the locked portion 44 engaged with the locking portion 43.

In the mounting structure for the EA material 41, the location and the number of the locking portion 43 and the locked portion 44 are arbitrary, and EA materials of various shapes can be securely and easily mounted to the trim. Further, even if the EA material is soft, the EA material can be securely fastened by increasing the number of the locking portion 43 and the locked portion 44.

To manufacture the EA material 41 having the locked portion 44, a mold including a lower mold 50 and an upper mold 51 is used, as illustrated in FIG. 12a. The upper mold 51 is provided with a convexity 52 onto which the locked portion 44 fits, and a magnet 53 for magnetically suctioning and holding the locked portion 44. The convexity 52 is in an approximately cylindrical shape, and the diameter of the convexity 52 is very slightly smaller than the diameter of the circle passing through the leading ends of the pawls 45. The locked portion 44 can be inserted in and removed from the convexity 52. The locked portion 44 is held by the convexity 52 of the upper mold 51, and a synthetic resin material is supplied in the cavity for molding. In the case of urethane foam or the like, the original solution of the urethane foam or the like is supplied in the lower mold 50 and foamed. The injection foam molding may be employed.

When the original solution of the resin is foamed, the foamed rein adheres to the locked portion 44, and the EA material 41 integrated with the locked portion 44 is molded. Then, the upper mold 51 is removed for the mold removal, and the EA material 41 having the locked portion 44 is molded, as illustrated in FIG. 12b. When the foamed resin is the urethane foam, the bond strength between the EA material 41 made of the foamed resin and the locked portion 44 made of a metal is sufficiently high.

Figure 13:
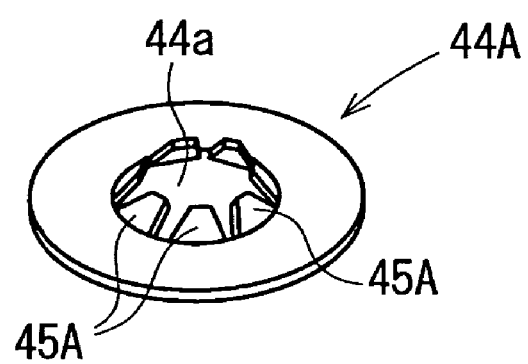
FIG. 13 is a perspective view of another locked portion.

The above-described embodiment is one example of the present invention. Thus, the present invention may be implemented in other embodiments than the illustrated one. For example, as in the case of pawls 45A of a locked portion 44A shown in FIG. 13, each of the pawls of the locked portion may be in an approximately trapezoidal shape. Further, the hole 44a of the locked portion may be in one of other shapes than the one illustrated in FIGS. 11a and 11b, such as a rectangular shape and a square shape.

Figure 14:
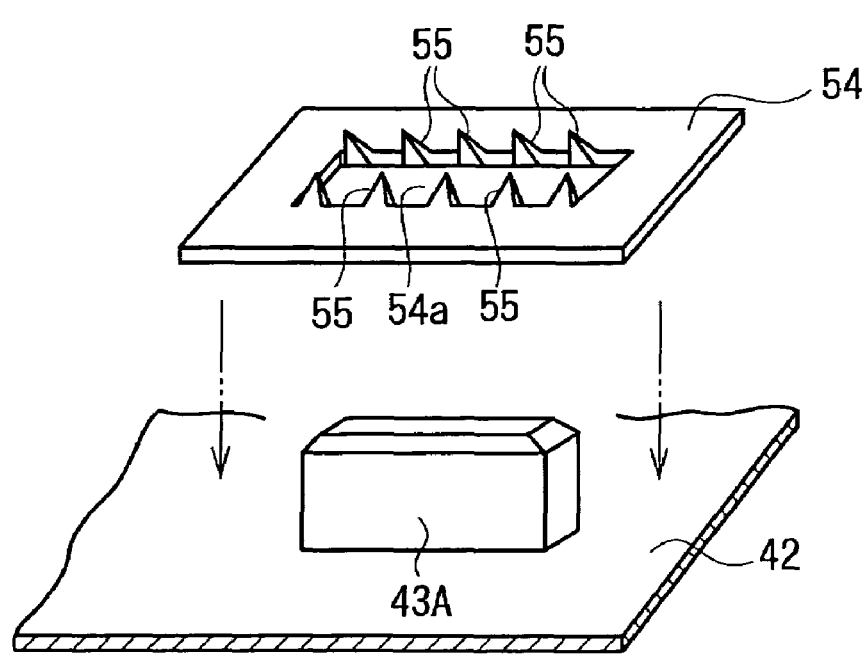
FIG. 14 is a perspective view illustrating the engaging relationship between the locking portion and the locked portion according to another embodiment.

FIG. 14 illustrates a locked portion 54 including a rectangular hole 54a and a plurality of pawls 55 projecting from the inner circumferential rim of the hole 54a. The respective pawls 55 project obliquely and toward the center of the hole 54a to be oblique toward one side with respect to the plate surface of the locked portion 54. The pawls 55 are each in a triangular shape. However, each of the pawls 55 may be in a trapezoidal shape, as illustrated in the above FIG. 13, or may be in a rectangular shape or a square shape, although not illustrated.

Similarly to the above-described locked portion 44, the locked portion 54 including the rectangular hole 54a is integrated with the surface of the EA material (the illustration of the EA material is omitted in FIG. 14) such that the pawls 55 faces the direction of the cavity of the EA material. Then, a locking portion 43A is inserted into the cavity of the EA material through the hole 54a, and the pawls 55 dig into the side surfaces of the locking portion 43A. Thereby, the EA material is mounted to the trim 42.

Figure 15:
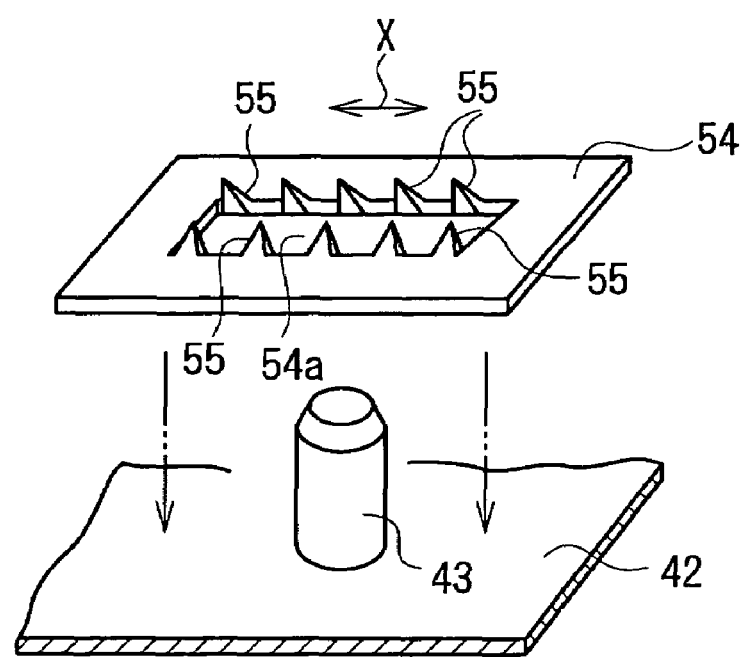
FIG. 15 is a perspective view illustrating the engaging relationship between the locking portion and the locked portion according to another embodiment.

In FIG. 14, the locking portion 43A projecting from the trim 42 is in a rib-like rectangular plate shape. As illustrated in FIG. 15, however, the locking portion may be the cylindrical locking portion 43 illustrated in the above FIG. 11. In this case, the diameter of the locking portion 43 is smaller than the width of the short sides of the hole 54a and larger than the interval between the pawls 55 and 55 on the long sides of the hole 54 so that the leading ends of the pawls 55 dig into the locking portion 43 inserted into the hole 54a.

The cylindrical locking portion 43 can be inserted at an arbitrary position in the longitudinal direction (the X direction) of the hole 54a. Therefore, even if there is a small error in the relative positional relationship between the locking portion 43 and the locked portion 54, such an error can be absorbed.

Figure 16:
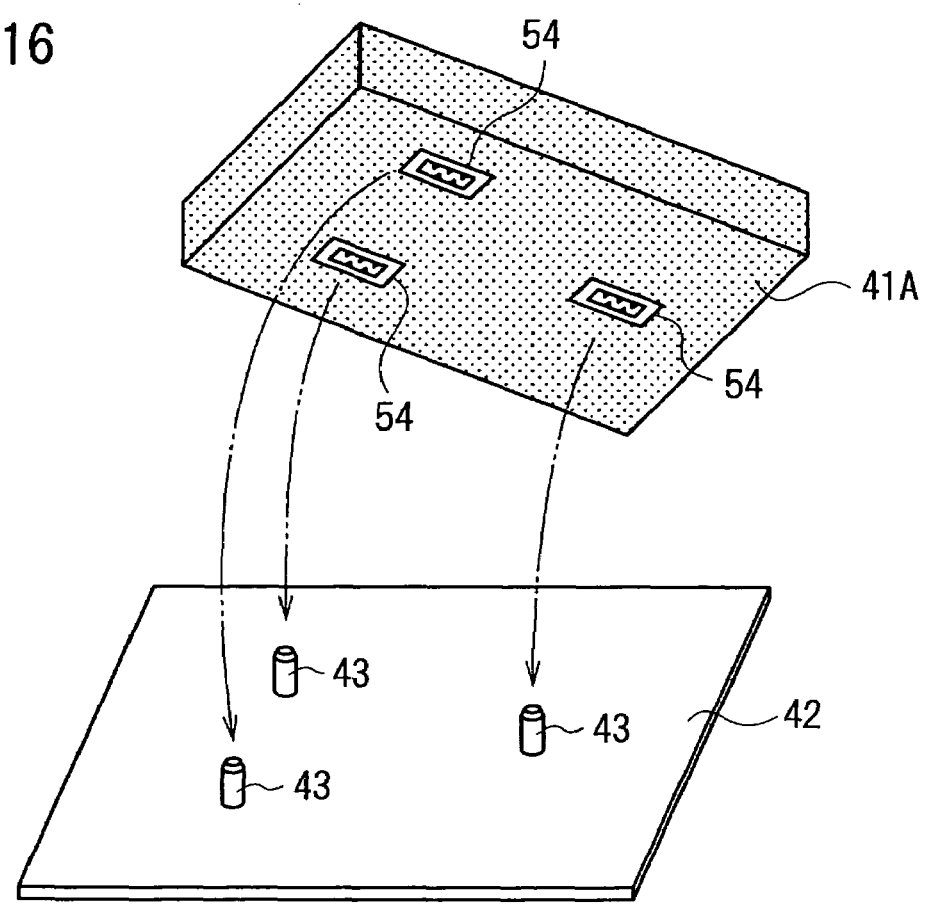
FIG. 16 is an exploded perspective view illustrating a mounting structure for an EA material according to another embodiment.
Figure 18:
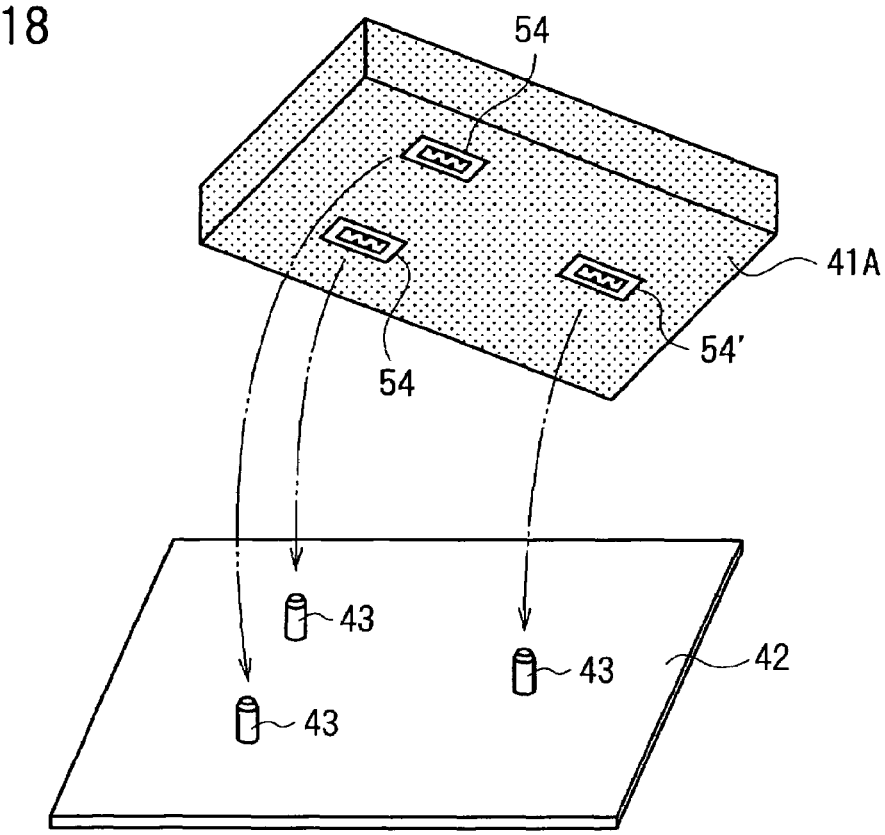
FIG. 18 is a perspective view illustrating a different embodiment.

FIG. 16 is an exploded perspective view illustrating a mounting structure for an EA material 41A, in which the EA material 41A having three locked portions 54 is mounted to the trim 42 provided with three locking portion 43 projecting therefrom. The locked portions 54 of the EA material 41 are arranged such that the respective holes 54a of the locked portions 54 are parallel to one another in the longitudinal direction (the X direction) thereof. In this case, even if there is a small positional error in the X direction in the respective locking portions 43, the EA material 41A can be mounted to the trim 42. As illustrated in FIG. 18, one of the locked portions 54' may be arranged perpendicularly to the other locked portions 54.

Figure 17:
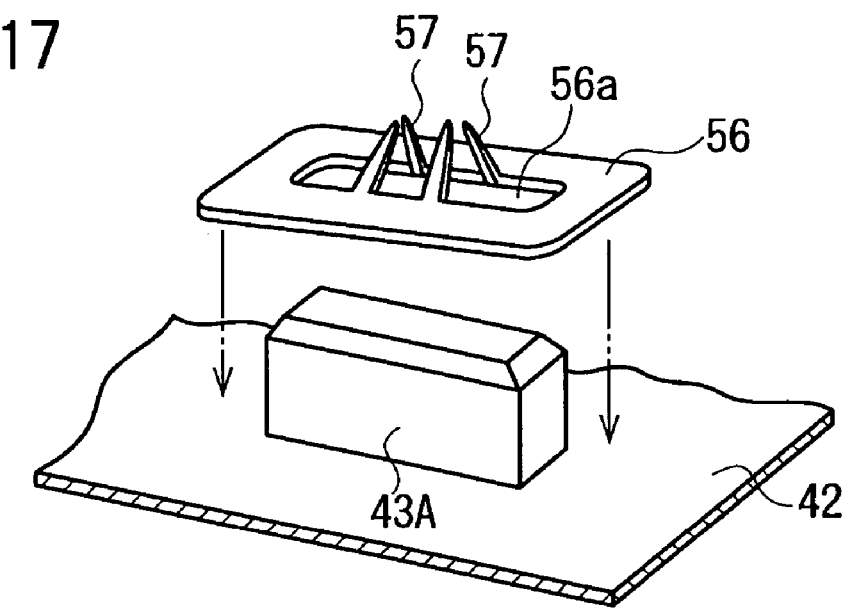
FIG. 17 is a perspective view illustrating the engaging relationship between the locking portion and the locked portion according to another embodiment.

FIG. 17 is a perspective view illustrating another example of a locked portion 16 having a rectangular hole 56a. Pawls 57 of the locked portion 56 are elongated and smaller in number than those of the locked portion 54 illustrated in FIGS. 14 and 15. The locked portion 56 can be used in engagement with the rib-like locking portion 43A.

The invention claimed is:

1. A mounting structure for an EA material, comprising:
   the EA material;
   a member, wherein the EA material is mounted to the member, the member includes a rib, and the EA material includes a concave slit into which the rib fits, and
   a clip, having a pair of facing pieces disposed to the inner surface of the concave slit to face each other across the concave slit and a bridging piece connecting the facing pieces, the EA material integrally includes the clip.
   the pair of facing pieces nip the rib, the facing pieces including pawls for digging into the rib; and
   the clip includes a pair of opposing anchor pieces buried in the EA material, each of the anchor pieces extending from an opposing end of the bridging piece.

2. The mounting structure for an EA material according to claim 1, characterized in that the clip includes surface pieces extending from the respective facing pieces in directions of separating from each other and disposed along the surface of the EA material.

3. The mounting structure for an EA material according to claim 1, characterized in that the length in the longitudinal direction of the rib is shorter than the length in the longitudinal direction of the concave slit.

4. The mounting structure for an EA material according to claim 1, characterized in that the member includes a plurality of ribs which are approximately perpendicular to one another in the longitudinal direction thereof.

5. The mounting structure for an EA material according to claim 1, characterized in that the clip is made of a metal.

6. The mounting structure for an EA material according to claim 5, characterized in that the metal is ferromagnetic.

7. The mounting structure for an EA material according to claim 1, characterized in that the rib is made of a synthetic resin.

8. The mounting structure for an EA material according to claim 1, characterized in that the member is a trim of an automobile.

9. The mounting structure for an EA material according to claim 1, characterized in that the EA material is made of synthetic resin foam such as rigid urethane foam.

* * * * *